(12) United States Patent
Bobrek et al.

(10) Patent No.: US 11,163,092 B2
(45) Date of Patent: Nov. 2, 2021

(54) SCALABLE SCHEDULING OF PARALLEL ITERATIVE SEISMIC JOBS

(71) Applicants: Aleksandar Bobrek, Houston, TX (US); Anoop A. Mullur, Spring, TX (US); Christopher S. Beard, Spring, TX (US); Arrian M. Brantley, Spring, TX (US); Michael B. Townsley, Houston, TX (US); Pavel Dimitrov, Houston, TX (US)

(72) Inventors: Aleksandar Bobrek, Houston, TX (US); Anoop A. Mullur, Spring, TX (US); Christopher S. Beard, Spring, TX (US); Arrian M. Brantley, Spring, TX (US); Michael B. Townsley, Houston, TX (US); Pavel Dimitrov, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 916 days.

(21) Appl. No.: 14/943,382

(22) Filed: Nov. 17, 2015

(65) Prior Publication Data
US 2016/0178801 A1 Jun. 23, 2016

Related U.S. Application Data

(60) Provisional application No. 62/093,991, filed on Dec. 18, 2014.

(51) Int. Cl.
*G01V 99/00* (2009.01)
*G01V 1/30* (2006.01)

(52) U.S. Cl.
CPC ............ *G01V 99/005* (2013.01); *G01V 1/303* (2013.01)

(58) Field of Classification Search
None
See application file for complete search history.

(56) References Cited

U.S. PATENT DOCUMENTS 3,812,457 A 5/1974 Weller
3,864,667 A 2/1975 Bahjat
(Continued)

FOREIGN PATENT DOCUMENTS

CA 2 796 631 11/2011
EP 1 094 338 4/2001
(Continued)

OTHER PUBLICATIONS

Hellerstein et al., "Science in the Cloud", 2012, IEEE Internet Computing, pp. 64-68 (Year: 2012).*
(Continued)

*Primary Examiner* — Brent A. Fairbanks
(74) *Attorney, Agent, or Firm* — ExxonMobil Upstream Research Company, Law Department

(57) ABSTRACT

System and method for scalable and reliable scheduling of iterative seismic full wavefield inversion algorithms with alternating parallel and serial stages of computation on massively parallel computing systems. The workers are independent, initiating actions and unaware of each other, and given limited information. This enables application of optimal scheduling, load-balancing, and reliability techniques specific to seismic inversion problems. The central dispatcher specifies the structure of the inversion, including task dependency, and keeps track of progress of work. Management tools enable the user to make performance and reliability improvements during the execution of the seismic inversion.

10 Claims, 4 Drawing Sheets

(56) References Cited

U.S. PATENT DOCUMENTS

| | | |
|---|---|---|
| 4,159,463 A | 6/1979 | Silverman |
| 4,168,485 A | 9/1979 | Payton et al. |
| 4,545,039 A | 10/1985 | Savit |
| 4,562,650 A | 1/1986 | Nagasawa et al. |
| 4,575,830 A | 3/1986 | Ingram et al. |
| 4,594,662 A | 6/1986 | Devaney |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,991,695 A * | 11/1999 | Wang ............... G01V 1/301 702/14 |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,905,916 B2 | 6/2005 | Bartsch et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,027,927 B2 | 7/2006 | Routh et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,213,261 B2 | 7/2012 | Imhof et al. |
| 8,248,886 B2 | 8/2012 | Neelamani et al. |
| 8,380,435 B2 | 2/2013 | Kumaran et al. |
| 8,428,925 B2 | 4/2013 | Krebs et al. |
| 8,437,998 B2 | 5/2013 | Routh et al. |
| 8,489,632 B1 * | 7/2013 | Breckenridge ...... G06K 9/6288 707/778 |
| 8,547,794 B2 | 10/2013 | Gulati et al. |
| 8,688,381 B2 | 4/2014 | Routh et al. |
| 8,781,748 B2 | 7/2014 | Laddoch et al. |
| 8,849,623 B2 | 9/2014 | Carvallo et al. |
| 8,923,094 B2 | 12/2014 | Jing et al. |
| 9,176,247 B2 | 11/2015 | Imhof et al. |
| 9,194,968 B2 | 11/2015 | Imhof et al. |
| 9,195,783 B2 | 11/2015 | Mullur et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0073529 A1 * | 4/2004 | Stanfill ................. G06F 9/4494 706/45 |
| 2004/0199330 A1 | 10/2004 | Routh et al. |
| 2004/0225438 A1 | 11/2004 | Okoniewski et al. |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 | 1/2009 | Song |

(56) References Cited

U.S. PATENT DOCUMENTS

| | | |
|---|---|---|
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0048731 A1 | 3/2011 | Imhof et al. |
| 2011/0051553 A1 | 3/2011 | Scott et al. |
| 2011/0090760 A1* | 4/2011 | Rickett .................. G01V 1/282 367/73 |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1* | 3/2012 | Routh .................... G01V 1/28 166/369 |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316786 A1* | 12/2012 | Liu .................... G01V 1/303 702/2 |
| 2012/0316790 A1 | 12/2012 | Washbourne et al. |
| 2012/0316844 A1 | 12/2012 | Shah et al. |
| 2012/0316845 A1* | 12/2012 | Grey .................... G06F 9/5094 703/2 |
| 2012/0316850 A1 | 12/2012 | Liu et al. |
| 2013/0030777 A1 | 1/2013 | Sung et al. |
| 2013/0060539 A1 | 3/2013 | Baumstein |
| 2013/0081752 A1 | 4/2013 | Kurimura et al. |
| 2013/0090906 A1 | 4/2013 | AlShaikh et al. |
| 2013/0116927 A1 | 5/2013 | DiCaprio et al. |
| 2013/0138408 A1* | 5/2013 | Lee .................... G01V 1/282 703/2 |
| 2013/0151161 A1 | 6/2013 | Imhof et al. |
| 2013/0238246 A1 | 9/2013 | Krebs et al. |
| 2013/0238249 A1 | 9/2013 | Xu et al. |
| 2013/0279290 A1 | 10/2013 | Poole |
| 2013/0282292 A1 | 10/2013 | Wang et al. |
| 2013/0311149 A1 | 11/2013 | Tang |
| 2013/0311151 A1 | 11/2013 | Plessix |
| 2014/0095131 A1 | 4/2014 | DiCaprio et al. |
| 2014/0118350 A1 | 5/2014 | Imhof et al. |
| 2014/0136170 A1 | 5/2014 | Leahy et al. |
| 2014/0180593 A1 | 6/2014 | Schmedes et al. |
| 2014/0257780 A1 | 9/2014 | Jing et al. |
| 2014/0278311 A1 | 9/2014 | Dimitrov et al. |
| 2014/0278317 A1 | 9/2014 | Dimitrov et al. |
| 2014/0350861 A1 | 11/2014 | Wang et al. |
| 2014/0358445 A1 | 12/2014 | Imhof et al. |
| 2014/0358504 A1 | 12/2014 | Baumstein et al. |
| 2014/0365132 A1 | 12/2014 | Imhof et al. |
| 2014/0372043 A1 | 12/2014 | Hu et al. |
| 2015/0123825 A1* | 5/2015 | De Corral .......... H01J 49/0036 341/87 |
| 2015/0293247 A1 | 10/2015 | Imhof et al. |
| 2015/0301225 A1 | 10/2015 | Dimitrov et al. |
| 2015/0309197 A1 | 10/2015 | Dimitrov et al. |
| 2015/0316685 A1 | 11/2015 | Dimitrov et al. |
| 2016/0033661 A1 | 2/2016 | Bansal et al. |
| 2016/0139282 A1 | 5/2016 | Dimitrov |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

Wang et al., "Distributed Parallel Processing Based on Master/Worker Model in Heterogeneous Computing Environment", Feb. 2012, Advances in information Sciences and Service Sciences(AISS), vol. 4, No. 2, pp. 49-57 (Year: 2012).*

Bonham et al., "Seismic data modelling using parallel distributed MATLAB", SEG Houston 2009 International Exposition and Annual Meeting, pp. 2692-2696 (Year: 2009).*

Lee, et al. (2013), "An Optimized Parallel LSQR Algorithm for Seismic Tomography", *Computers & Geosciences*, 62, pp. 184-197.

U.S. Appl. No. 14/329,431, filed Jul. 11, 2014, Krohn et al.

U.S. Appl. No. 14/330,767, filed Jul. 14, 2014, Tang et al.

Araya-Polo, M. et al., "3D Seismic Imaging through Reverse-Time Migration on Homogeneous and Heterogeneous Multi-Core Processors," *Scientific Programming* 17(1-2), pp. 185-198 (2009).

Brossier, R., "Two-dimensional frequency domain visco-elastic full waveform inversion: Parallel algorithms, optimization and performance," *Computers and Geosciences* 37(4), pp. 444-455 (2010).

Fallat, M.R. et al., "Geoacoustic inversion via local, global, and hybrid algorithms," *Journal of the Acoustical Society of America* 105, pp. 3219-3230 (1999).

(56) References Cited

OTHER PUBLICATIONS

Sirgue, L. et al., "Efficient waveform inversion and imaging: A strategy for selecting temporal frequencies," *Geophysics* 69, 231-248 (2004).
Suh, S.Y. et al., "Cluster programming for reverse time migration," *The Leading Edge*, pp. 94-97 (Jan. 2010).
Tarantola, A., "Inversion of seismic reflection data in the acoustic approximation," *Geoophysics* 49, pp. 1259-1266 (1984).

* cited by examiner

SCALABLE SCHEDULING OF PARALLEL ITERATIVE SEISMIC JOBS

CROSS-REFERENCE TO RELATED APPLICATION

This application claims the benefit of U.S. Provisional Patent Application 62/093,991 filed Dec. 18, 2014 entitled SCALABLE SCHEDULING OF PARALLEL ITERATIVE SEISMIC JOBS, the entirety of which is incorporated by reference herein.

FIELD OF THE INVENTION

This disclosure relates generally to the field of seismic prospecting for hydrocarbons and, more particularly, to seismic data processing. Specifically the disclosure relates to a system or method for scalable and reliable scheduling for massive parallel computing of full wavefield inversion ("FWI") of seismic data to infer a physical property model, such as a seismic wave propagation velocity model, of the subsurface.

BACKGROUND

Geophysical inversion attempts to find a model of subsurface properties that optimally explains observed data and satisfies geological and geophysical constraints. See, e.g., Tarantola, A., "Inversion of seismic reflection data in the acoustic approximation," Geophysics 49, 1259-1266 (1984); and Sirgue, L., and Pratt G. "Efficient waveform inversion and imaging: A strategy for selecting temporal frequencies," Geophysics 69, 231-248 (2004). Acoustic wave propagation velocity is determined by the propagating medium, and hence it is one such physical property for which a subsurface model is of great interest. There are a large number of well-known methods of geophysical inversion. These well-known methods may be classified as falling into one of two categories, namely iterative inversion and non-iterative inversion. Non-iterative inversion may be used to mean inversion that is accomplished by assuming some simple background model and updating the model based on the input data. This method does not use the updated model as input to another step of inversion. For the case of seismic data these methods are commonly referred to as imaging, migration (although typical migration does not update the model), diffraction tomography or Born inversion. Iterative inversion may be used to mean inversion involving repetitious improvement of the subsurface properties model such that a model is found that satisfactorily explains the observed data. If the inversion converges, then the final model will better explain the observed data and will more closely approximate the actual subsurface properties. Iterative inversion may generally produce a more accurate model than non-iterative inversion, but may also be much more expensive to compute.

One iterative inversion method employed in geophysics is cost function optimization. Cost function optimization involves iterative minimization or maximization of the value, with respect to the model M, of a cost function S(M) selected as a measure of the misfit between calculated and observed data (this is also sometimes referred to as the objective function), where the calculated data are simulated with a computer using a current geophysical properties model and the physics governing propagation of the source signal in a medium represented by a geophysical properties model. (A computational grid subdivides the subsurface region of interest into discrete cells, and the model consists of assigning a numerical value for at least one physical property such as seismic wave propagation velocity to each cell. These numerical values are called the model parameters.) The simulation computations may be done by any of several numerical methods including but not limited to finite difference, finite element or ray tracing.

Cost function optimization methods may be classified as either local or global. See, e.g., Fallat, M. R., Dosso, S. E., "Geoacoustic inversion via local, global, and hybrid algorithms," Journal of the Acoustical Society of America 105, 3219-3230 (1999). Global methods may involve computing the cost function S(M) for a population of models {M1, M2, M3, . . . } and selecting a set of one or more models from that population that approximately minimize S(M). If further improvement is desired, this new selected set of models may then be used as a basis to generate a new population of models that can be again tested relative to the cost function S(M). For global methods, each model in the test population can be considered to be an iteration, or, at a higher level, each set of populations tested can be considered an iteration. Well known global inversion methods include Monte Carlo, simulated annealing, genetic, and evolution algorithms. Local cost function optimization may involve: (1) selecting a starting model M; (2) computer-simulating predicted data corresponding to the measured data and computing a cost function S(M); (3) computing the gradient of the cost function with respect to the parameters that describe the model; and (4) searching for an updated model that is a perturbation of the starting model in the negative gradient direction in multi-dimensional model parameter space (called a "line search") that better explains the observed data. This procedure may be iterated by using the new updated model as the starting model and repeating steps 1-4. The process continues until an updated model is found that satisfactorily explains the observed data. Typically, this is taken when the updated model agrees with the previous model to within a preselected tolerance, or another stopping condition is reached. Commonly used local cost function inversion methods include gradient search, conjugate gradients and Newton's method.

As discussed above, iterative inversion may be preferred over non-iterative inversion in some circumstances because it yields more accurate subsurface parameter models. Unfortunately, iterative inversion may be so computationally expensive that it would be impractical to apply it to some problems of interest. This high computational expense is the result of the fact that all inversion techniques require many compute-intensive forward and sometimes also reverse simulations. Forward simulation means computation of the data forward in time, e.g. the simulation of data in step 2 above. Reverse simulation means computation of the data in discrete time steps running backward in time. Back-propagation of the waveform may be used when a particularly efficient method, called the adjoint method, is used to compute the gradient of the cost function. See, Tarantola, A., "Inversion of seismic reflection data in the acoustic approximation," Geophysics 49, 1259-1266 (1984). The compute time of any individual simulation is generally proportional to the number of sources to be inverted, and typically there may be large numbers of sources in geophysical data. By encoding the sources, multiple sources may be simulated simultaneously in a single simulation. See, U.S. Pat. No. 8,121,823 to Krebs, et al. The problem may be exacerbated for iterative inversion because the number of simulations that must be computed is proportional to the number of iterations in the inversion, and the number of iterations required is typically on the order of hundreds to thousands.

FIG. 1 illustrates how the data inversion work stream may be divided into parallel stages 11 and serial stages 12, where the parallel stages are inherently suitable to simultaneous computation on many parallel processors. The parallel stages are the stages in the process where many different sources (e.g., different source locations) are being simulated. For example, in what is termed as the "gradient stage" in FIG. 1, each parallel computer may simulate predicted data for all receiver locations for one or more source shots, then compute the contribution to the cost function, and then the contribution to the gradient of the cost function, for its assigned source shots. Input quantities for each parallel computer include source and receiver locations, source parameters, and the measured data at the receiver for those sources. The serial stage shown following the gradient stage in FIG. 1 sums all of the gradient contributions. This gives a direction in parameter space, usually a negative of the gradient, in which to update the model. For the gradient stage, the simulations will be forward simulations to generate the predicted data to be used with the survey data to compute the cost function, but will also include reverse simulations if the adjoint method is used to compute the gradient of the cost function. In the line-search stage, predicted data are simulated in the direction given by the gradient for several different model update step sizes, and the step size generating the minimum cost function value (or maximum cost function value in case of a cross-correlation cross function) is selected and the model is incremented at the serial stage following the line search stage. Thus, the line search involves several more forward simulations for each geophysical source. The parallel stages 11 in FIG. 1 graphically illustrate an additional challenge to iterative geophysical inversion, whereby delays in processing a single source will delay the final solution and result in low efficiency and utilization of computer hardware.

Due to its high computational cost, iterative inversion typically requires a large high performance computing ("HPC") system in order to reach a solution in a practical amount of time. As described above, a single iterative inversion can be decomposed into many independent components and executed on hundreds of thousands of separate compute cores of an HPC system, thus reducing time to solution. Problem decomposition can be achieved at several levels: for a single forward or reverse simulation, the model domain can be spatially divided among computational cores with each core communicating only the information at the edge of the subdomain to neighboring cores. This is a common parallel speedup strategy used in iterative and non-iterative inversion, as well as other scientific computing domains. See, e.g., Araya-Polo, M., et. al. "3D Seismic Imaging through Reverse-Time Migration on Homogeneous and Heterogeneous Multi-Core Processors," *Scientific Programming* 17(1-2):185-198 (2009); Brossier, R., "Two-dimensional frequency-domain visco-elastic full waveform inversion: Parallel algorithms, optimization and performance," *Computers and Geosciences*, Volume 37, Issue 4, p. 444-455 (2010). However, the scalability of such methods is eventually limited by the overhead of sharing edge information, since computational work done by each computational core decreases as number of subdomains is increased to grow the parallel speedup.

Another parallel speedup method involves dividing an iterative inversion across separate forward or reverse simulations for each source to be inverted. As there are large numbers of sources in geophysical data which can be modeled separately, this approach enables many independent simulations to be mapped onto an HPC system without scalability concerns due to communication overhead. For traditional non-iterative seismic inversion methods, this parallelization scheme is trivial to implement, as the sources can simply be divided into separate simulations and run to completion. See, e.g., Suh, S. Y., et. al., "Cluster programming for reverse time migration", *The Leading Edge*, January 2010. For iterative inversion, separate simulations for each source must be combined to determine the gradient of the cost function S(M) for the entire model area as well as the line search for the updated model, requiring efficient scheduling and load balancing among independent simulations to efficiently execute large inversions. Due to low communication requirements, parallelization across geophysical sources exhibits excellent scalability and presents the main opportunity to implement iterative seismic inversions in an efficient way on massively parallel computing systems. (Scalability refers to the algorithm's ability to use more parallel processors on a single problem, with overall time to solution decreasing proportionally as more processors are added).

The two parallelization strategies described above, parallelization of single source simulation by domain decomposition and parallelization across separate seismic sources, can both be used concurrently to reduce time to solution. The attention is now turned to the implementation methods for the second parallelization strategy using separate seismic sources, for which there are several different published implementation methods with which parallel speedup of iterative geophysical inversion may be achieved.

In typical practice, HPC systems use message passing (e.g., MPI) or shared memory (e.g., OpenMP, OpenACC, Cilk Plus, Intel Threaded Building Blocks, Parallel Global Address Space (PGAS) languages) techniques to decompose a scientific computing problem across many compute cores. This is a common method for parallelization of seismic simulations for a single geophysical source, and can be used to parallelize across separate sources as well. However, this method has several disadvantages when applied to large scale iterative seismic inversions as parallelization via message passing or shared memory encapsulates the entire inversion as a single HPC job. On current HPC systems, failure of a single thread, MPI rank, or a compute core may cause the entire job to fail, thereby losing progress to date. Regular checkpointing to disk may be required to be performed as long geophysical inversion run times coupled with typical HPC failure rates make a single failure likely to occur during a single inversion. Another limitation of encapsulation into a single job is that it does not allow the system level scheduler to interject other work onto nodes that are temporarily unused during inversion. Since compute demands can drastically change during the course of iterative geophysical inversion (serial stages of FIG. 1 require a very small amount of compute power compared to a large demand in parallel stages), and HPC systems generally lack job-level preemptive schedulers (preemptive scheduling would allow currently running jobs to be paused and switched for a more urgent job), without novel approaches, iterative geophysical inversion can result in very inefficient uses of the system. If any additional capability needs to be added into the inversion workflow, they must be integrated as additional ranks or threads (ranks or threads are common methods to specify single serial part of a parallel program) and coordinated with existing simulations, which can be time consuming Finally, changing the number of compute nodes (a node means a grouping of one or more processing units in a close proximity to each other within an HPC system) used for the inversion during runtime or running the inversion across multiple heterogeneous sets of HPC nodes is not possible using this approach.

An alternative to the above approaches is to submit each separate geophysical source simulation as a separate HPC job, and allow the system batch job scheduling software (e.g., Moab Cluster Suite, SLURM, PBS Professional, Condor, etc.) to manage these jobs. Separate jobs would share information via files on a shared disk, and workflow support packages like Condor Directed Acyclic Graph Manager (DAGman) or Pegasus can coordinate complex workflows with many dependent tasks. This approach is simple to set up and implement, but suffers from slow scheduling times of batch scheduling software, which is typically not equipped to handle tens of thousands to hundreds of thousands of separate jobs that geophysical inversion may inject into the system each iteration. Additionally, batch schedulers tend to prioritize overall system utilization instead of the overall workflow runtime, as they are designed to extract maximum use of the HPC system having small numbers (e.g., tens) of large workloads queued up to run.

What is needed is a method to efficiently schedule and execute many separate geophysical source simulations within the context of a single iterative seismic inversion. As such, the method should balance between the overall iteration runtime and system utilization, allow efficient scaling of the inversion to many cores in order to make processing of realistic seismic surveys possible, and provide reliability capabilities to enable inversion runs lasting multiple days or weeks. There are a variety of difficulties with delivering such a system. For example, at high levels of parallelism (100 k+ cores—where core is an independent processor within the HPC system capable of executing a single serial part of a parallel program) keeping consistent global picture of the computation state is expensive. Collecting information across all the tasks can affect the overall performance of the system. Additionally, at high levels of parallelism (100 k+ cores) hardware may be inherently unreliable. This means that one of the parallel tasks may be likely to fail over long execution times. Recovery from failure is not trivial since collection of global state needed for recovery is expensive (see first item). Further, load balancing and smart scheduling may become increasingly important as the level of parallelism increases because the "jitter" between task run times (e.g., the unevenness of tasks shown in FIG. 1) becomes a bigger percentage of overall runtime.

SUMMARY

This disclosure concerns a system and method for scalable and reliable scheduling for massive parallel computing of iterative geophysical inversion of seismic data to infer a physical property model, such as a seismic wave propagation velocity model, of the subsurface. In one embodiment, the invention is a parallel computing system for full wavefield inversion ("FWI") of seismic data, comprising a pool of computational units, called workers, each programmed to operate independently of each other and initiate and perform one or more computational tasks that arise in the course of the full wavefield inversion, and having an input stage adapted to receive information needed to perform a task, and an output stage; wherein the full wavefield inversion is organized into a series of parallel computational stages and serial computational stages, and each parallel stage is divided into a plurality of parallel computational tasks sized for a worker according to a selected job scale, a central dispatcher processor programmed to (a) provide task queues where tasks are made available to the workers and where the computational units output results of a completed task, wherein dependencies between tasks are enforced, and (b) monitor and store information relating to a current state of the full wavefield inversion, and a controller, interconnected with the central dispatcher and programmed with an optimization algorithm that decides whether to halt a computational task that has not converged after a predetermined number of iterations.

In another embodiment, the invention is a seismic prospecting method for exploring for hydrocarbons, comprising obtaining seismic survey data, processing the seismic survey data by full wavefield inversion to infer a subsurface model of velocity or other physical parameter, wherein the processing is performed on a system of parallel processors, called workers, dividing the full wavefield inversion into a sequence of parallel stages and serial stages, and defining one or more computational tasks to be performed at each stage, wherein the computational tasks are parallel tasks for a parallel stage, providing a pool of workers, each programmed to perform at least one of the computational tasks, and perform them independently and without knowledge of the other workers, and wherein a task is sized for a worker according to a selected job scale, providing a central dispatcher unit, being a processor programmed to maintain task queues, where tasks are placed for pickup by the workers and where completed tasks are returned by the workers, and enforce dependencies between tasks, monitor and store information relating to a current state of the full wavefield inversion, and providing a controller unit, interconnected with the central dispatcher and programmed with an optimization algorithm that decides whether to halt a computational task that has not converged after a predetermined number of iterations.

BRIEF DESCRIPTION OF THE DRAWINGS

The advantages of the present invention are better understood by referring to the following detailed description and the attached drawings, in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION

The present invention implements a distributed parallel framework for scalable and reliable scheduling of iterative geophysical inversions across large HPC systems. The invention decentralizes and separates computation, global state, and control mechanisms within the system, allowing scalability to hundreds of thousands of cores, while still providing ability to apply smart scheduling, load balancing, and reliability techniques specific to the seismic inversion problems.

Data parallelization means dividing the data processing by source shot among multiple processors. Data parallelization is inherently scalable. However, for full wavefield inversion ("FWI") at a large scale, serial sections (gradient stacking) and coordination of the inversion (how many shots to select, when finished, etc.) can complicate the pure data parallelization (across shots) and compromise scalability. The present invention avoids such problems.

Figure 2:
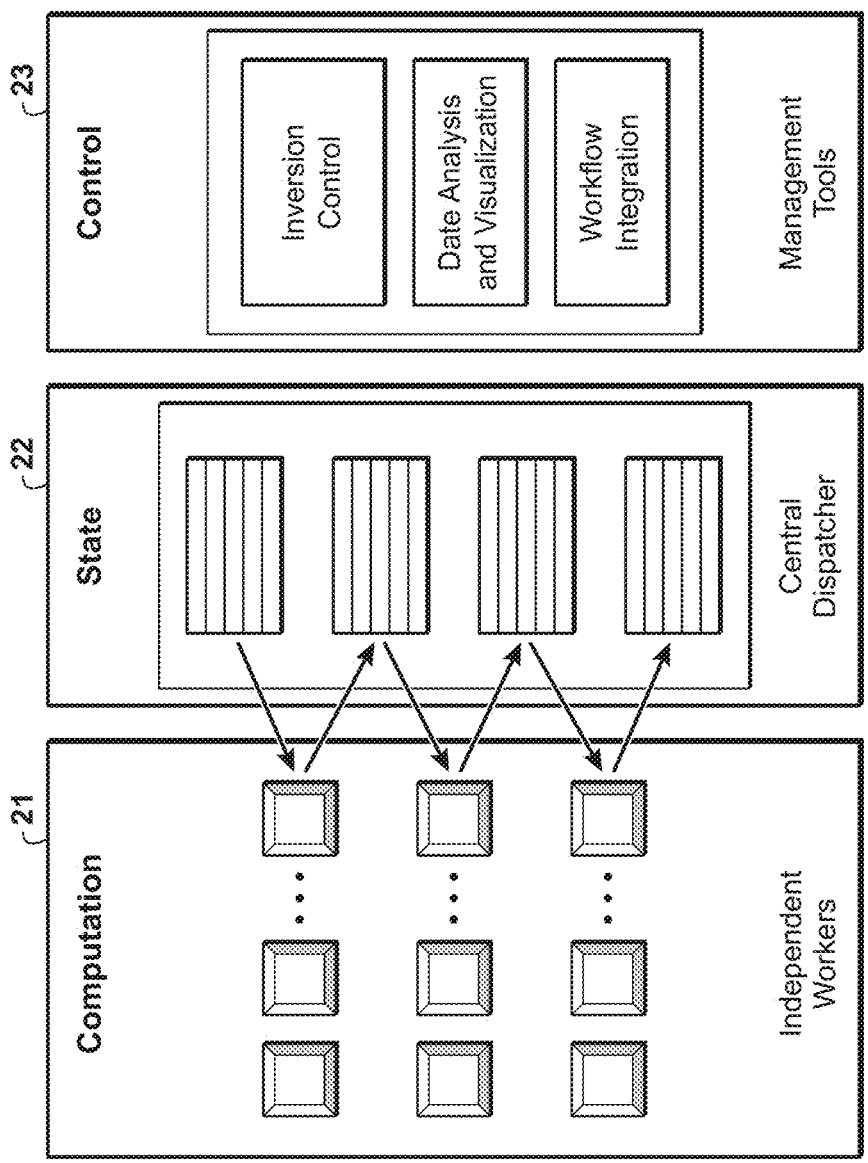
FIG. 2 is a schematic diagram of the seismic computation framework of one embodiment of the present invention.

FIG. 2 describes a system composed of many independent "workers" 21 that retrieve tasks from a central dispatcher 22. Thinking of them as animate objects for ease of explanation, the workers themselves may only be aware of the dispatcher and the task they are performing They may not be aware of how many other workers there are in the system or the specific tasks those other workers are performing. It may be prohibitively costly to provide this information to the workers, and one of the objectives of the present invention is to avoid a need for doing so. This allows independent workers to be dynamically added or removed from the system during execution, taking advantages of available temporary resources. Stated more precisely, the individual workers may add or remove themselves. Individual workers can also fail without affecting the rest of the system, allowing computation to continue. Dynamic addition and/or removal of resources while maintaining the ability to continue on failure are advantages of the many-task computing approach over more traditional HPC parallelization methods like the message passing interface (MPI).

As examples of the foregoing characteristics of independent workers, a worker might remove itself from the system if, for example, it was unable to run any jobs due to hardware failure. Another reason might be to give up its HPC nodes back to the system, possibly for another user's job on a shared system. Nodes may be temporarily borrowed, or returned, when available and when advantageous. A policy might be set whereby if a worker has no work for a specified length of time, the worker is shut down and the nodes returned to the system. Alternatively, this decision can be made manually by the user, observing information compiled by the central dispatcher on the status of the inversion. Regarding task failures, the user may specify at the beginning of the inversion how many shot simulations will be allowed to fail before the inversion will be halted.

The central dispatcher can be thought of as a passive responder to the active initiating by the independent workers, but the central dispatcher provides the jobs and the data and information to perform them, and monitors the status of all the jobs being performed by the workers, e.g., the state of the inversion process, for example, how many shot simulation failures have occurred. Using another example, the central dispatcher may be thought of as a centralized information store that specifies the structure of the inversion (i.e. how tasks are connected to each other) and keeps track of progress of work. The central dispatcher does not initiate action; the central dispatcher only responds to requests. Workers may function in an opposite way, namely, they may initiate actions but have limited information. In some published descriptions of conventional parallel processing of seismic inversion problems, there is a central controller that schedules seismic inversion tasks and hands out work to the parallel processors. The central controller stores information about where the tasks are, but unlike in the present inventive method, the central controller initiates performance of those tasks by their version of the workers. Yet even though certain tasks are decentralized in the present invention compared to conventional parallel processing, this pushing more responsibility to the workers is not true of every aspect of what the workers do. MPI (probably the most popular parallelization strategy, not just for seismic jobs) requires capability for a message to be addressed from one parallel "worker" to another. That means each worker needs to know the address that connects it to each other worker and, at a minimum, how many workers exist. A feature of the present invention is that a worker may not even "know" that there are other workers, much less who they are and what they are doing. A single word that describes this aspect of a worker in the present invention as well as the initiating aspect is independent.

Additionally, workers can execute on heterogeneous hardware, allowing a single type of parallel task to be executed on several different architectures simultaneously. This feature allows the framework to operate on a single seismic problem at high parallelism in environments where several generations of different hardware exist. Similarly a single inversion can be performed on a heterogeneous system where some components have traditional processors, while others have accelerators (graphical processing units, or GPU's; and field programmable gate arrays, or FPGA's; etc.).

Figure 4:
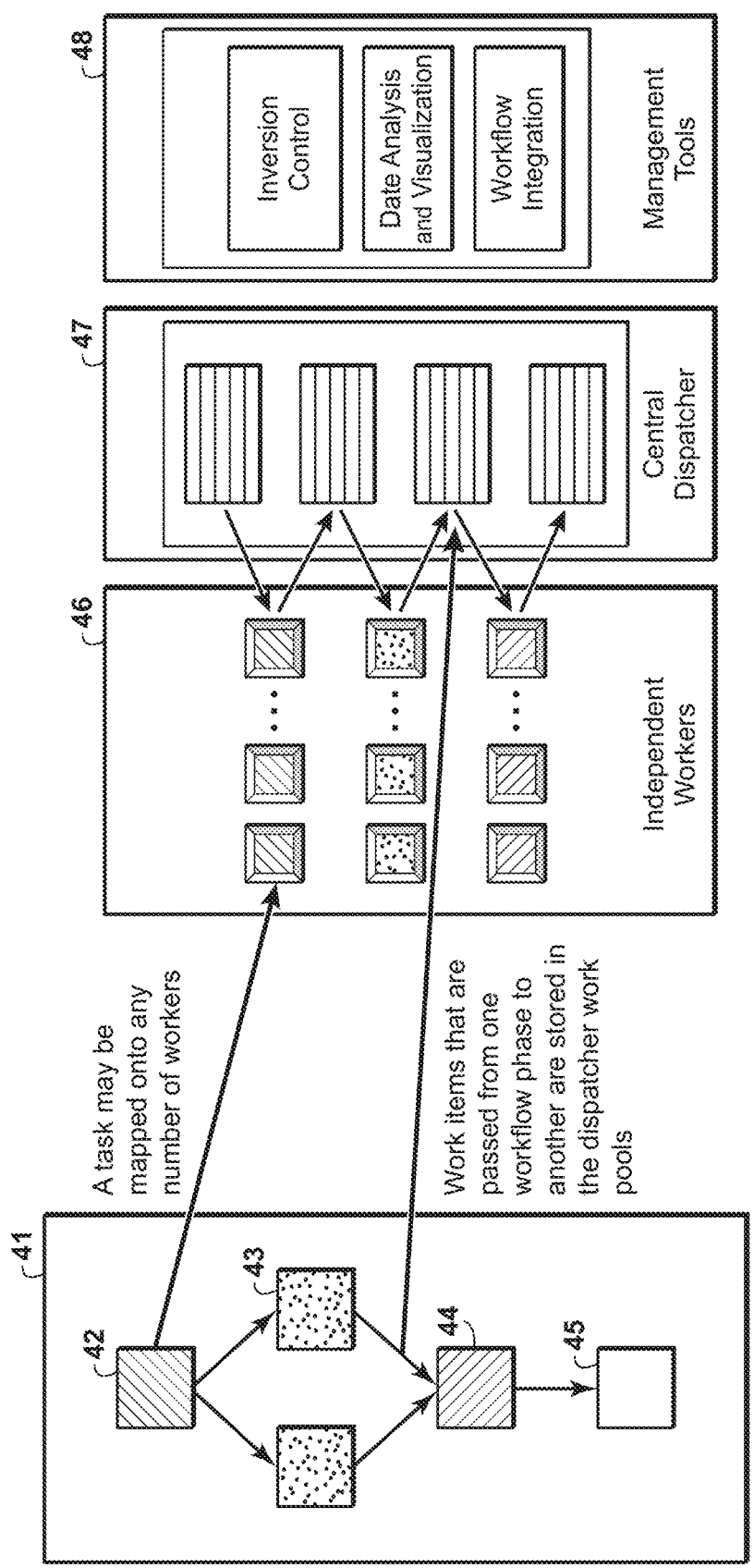
FIG. 4 schematically illustrates mapping dependent tasks (workflows) of a computation with parallel and serial stages onto the parallel computation framework according to one embodiment of the present invention.

The central dispatcher, shown as 22 in the middle of FIGS. 2 and 47 in FIG. 4, contains several types of task queues (shown as stacked white boxes in center of the dispatcher) allowing dependencies between tasks to be enforced. For example, one task might filter or pre-process seismic shot data while a second task, dependent on the first finishing, would take the processed seismic data and simulate propagation through the subsurface. Each independent worker is programmed with a list of task types it can execute, allowing dedicated heterogeneous hardware to be used for a certain stage in the processing flow.

Figure 3:
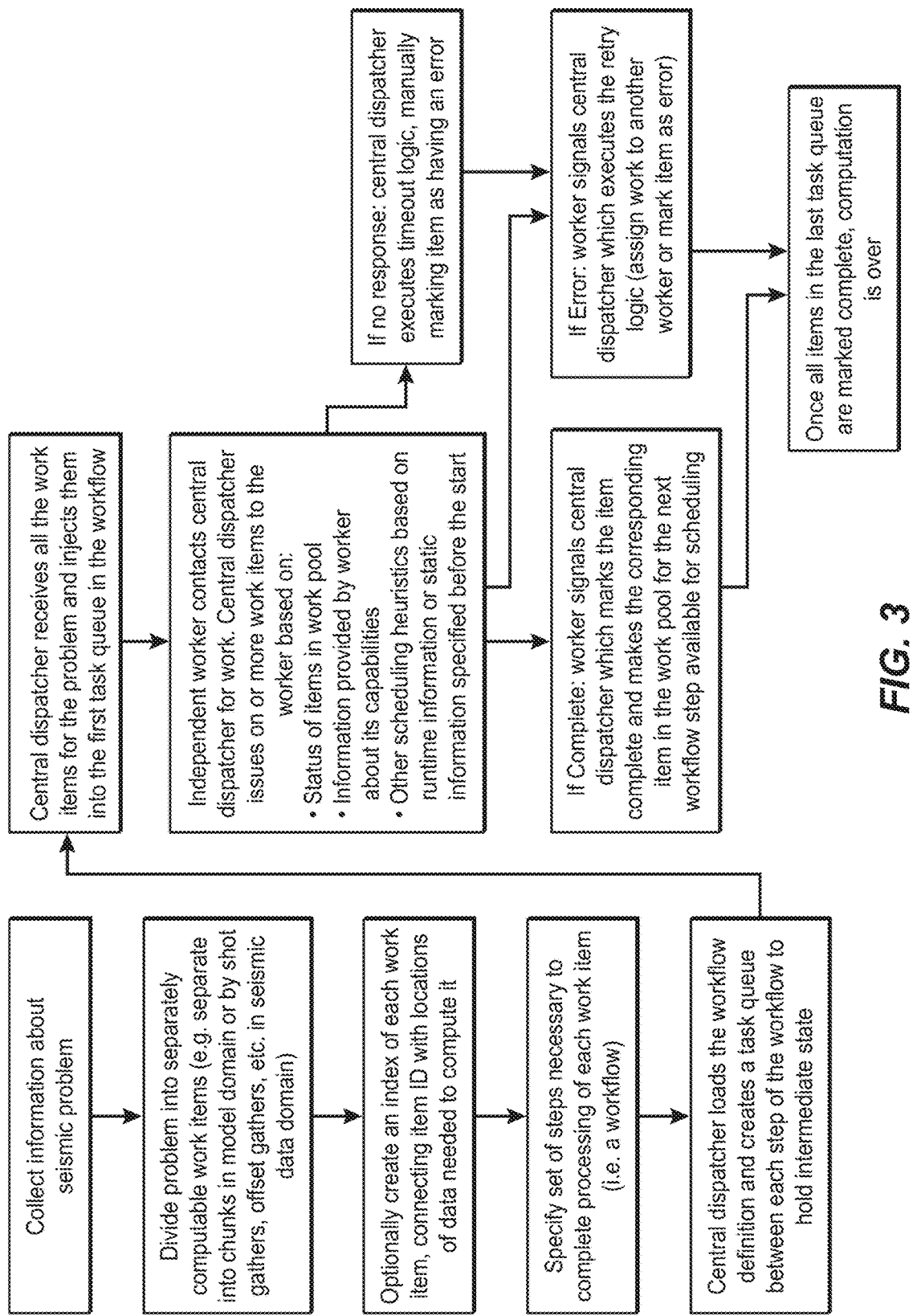
FIG. 3 is a flow chart describing how a seismic problem may be divided and executed via the central dispatcher and workers in one embodiment of the present inventive method.

The flow chart in FIG. 3 shows how a seismic problem can be executed in one embodiment of the present invention and details examples of the type of interactions that may happen between the central dispatcher and the workers. In the presence of many workers, this approach may allow seismic problems to be parallelized across a number of available work items.

Workers may not be aware of task dependencies; they may simply have an input pool of work which they grab their assignment from and an output pool where they place the result. An example of a task dependency in FWI is that the line search cannot begin until the gradient is computed. The central dispatcher in FIG. 4's example shows four tasks queues. The one at the top is functioning as an input queue. As the workers complete the task, they store the task result in the second queue, functioning as an output queue. But the output queue may become the input queue for a next task that is dependent on it as shown in FIG. 4, and so on. Thus, the central dispatcher does not move work between different queues in this example; the workers do. The worker that has finished one task and posted it in an output queue may or may not be qualified to perform the next task in the FWI sequence. For example, one task type in FWI may have been written for a GPU, but the rest of the tasks run only on regular processors. Thus the GPU workers will look only at one queue in the system, while the regular processors may take work from whichever queue offers it first. If the central dispatcher were to be programmed to have the responsibility to assign tasks to the workers, it would need to know all the workers present in the system, which workers have stopped working, which ones were killed by the user, and would need to know when additional workers have been added to the system. When failures occur, workers can disappear quietly, meaning that to have an accurate list of workers to assign work to, the central dispatcher would have to poll the workers to make sure they are still present. This type of operation may not scale well.

It may be desirable to run several big inversion problems simultaneously, each one loaded into its own central dispatcher, but with a common pool of independent workers. The user can control which inversion problem will get priority on the workers, thus scaling up some problems and scaling down others.

By connecting work pools together inside the central dispatcher, complex workflows that involve many dependent computational tasks can be mapped onto the proposed parallel computation system (FIG. 4). This allows the system user to consider the serial task dependencies (work flow) separately from the parallelism it will be executed with. In FIG. 4, 41 represents the work flow. The work flow is programmed by parts into workers. Each worker may know a single "arrow" (edge) in the work flow graph for the tasks it knows how to run. It does not know the work flow for tasks it is not supposed to run. So, the work flow may be distributed among the workers, but each worker may receive only the pieces they need to know, e.g. are capable of handling.

As a typical example from an FWI problem, 42 may represent a task that filters the input data and removes all frequencies above 30 Hz. The arrow going from task 42 to the right represents mapping of task 42 onto any number of workers 46. Other tasks are similarly mapped to workers 46. At task 43, the velocity model is prepared for simulation by chopping up the model to apertures just around the shot area. There are two paths from task 42 to task 43 because (in this illustrative example) the user decided to have larger apertures for shots at the edge of the survey, which sets up two types of tasks (shots in the center go to one box 43, shots on the edge get processed at the other box 43). Task 44 may be simulation and gradient computation, and task 45 may be stacking each shot gradient into the master gradient.

It may be noted that the workers performing task 44 in the work flow, the simulation and gradient computations, will need to know various parameters in order to execute, for example source location, other source parameters, and receiver locations. Some of these parameters are static (meaning they are known at the beginning of inversion), and some are dynamic (calculated by a preceding task). Each work item stored in the central dispatcher is essentially such a "bag" of parameters. The launcher of the inversion may populate all the static parameters, including source/receiver locations, source signature files, and parameters that specify the physics of the simulation, etc., into an appropriate task such as, in this case, task 44. For dynamic parameters, when the worker returns this bag of data (work item) to the central dispatcher to be put in the output queue, the central dispatcher can delete, modify, or add new parameters into the work item.

The type of work flow described above, with dependent tasks, is typical not only in FWI but in seismic processing in general, and FIG. 4 shows how a work flow of tasks dependent on each other may be mapped to the dispatcher/worker model of the present invention. The top horizontal arrow shows that a parallel piece of task 42 in the work flow gets executed by a worker. The bottom horizontal arrow shows that the line connecting tasks 43 and 44 in the work flow is represented by a queue in the central dispatcher 47. In other words, that queue holds the output of task 43 which becomes the input for task 44. As explained previously, the mapping indicated in FIG. 4 is programmed into the software that is installed in the central dispatcher and the software that is installed in the workers, although the workers may not know all the connections—only the connections for the tasks they know how to execute. A work flow (or any directed acyclic graph, using mathematical terminology) may be inputted into the dispatcher by specifying which queues are input and output queues for every task. There may be a configuration file that specifies this for every task. For example, for the shot gradient simulation task 44, input may be from a queue called "sim_in" and output may be put in queue called "sim_out". Dependent task 45 may be a stacking operation that needs to grab shot gradients from the simulation task, so its input queue will be "sim_out" and its output queue may be named "grad_out", which in the end may contain the stacked gradient. Workers may be programmed to know only input and output queue names for tasks types they know how (i.e., are programmed) to run. Information such as who will pick up the work further once they put it in an output queue may not be given to them.

The distributed nature of the system and the design of the central dispatcher allow for several performance and reliability improvements that are crucial to execution of seismic inversion at large scales. Using the present state of the ongoing inversion as monitored by the central dispatcher, global progress of the application can be tracked and displayed to the user, some of whose various possible interactions with the FWI system are represented by the management tools 48 in FIG. 4 (also shown as panel 23 on the right side of FIG. 2). Data Analysis and visualization tools can access the central dispatcher state and display runtime statistics, enabling debugging and performance analysis of complex parallel applications. Autonomous tools can make runtime decisions on how many items of work to inject into the work pools in the central dispatcher, effectively starting the computation. Ability to affect the system dynamically as it is running is of great value to seismic inversion, as optimization-style algorithms are by definition data driven and the amount of computation needed cannot be defined prior to execution. An example of this might be dynamically changing timeouts for tasks (how long the system will wait for a worker to complete a task before giving up) based on a statistical distribution of previous runs. Management tools may be user controlled or automated, or a combination of both. Just one example might be the system sends the user an e-mail when the inversion reaches a certain stage.

Another application of the invention is to parallelize the "stacking" stage in seismic processing. Stacking combines results calculated for portions of the seismic survey into a full survey result. Although computationally simple, at high levels of parallelism stacking can lag the overall inversion time if done serially. Using the system described above, parallelization can be done simply by adding additional workers into the system to perform the stacking task. "Partial stacks" from each parallel stacker can then be further combined into the final result. To optimize "reduce" operations such as stackers, several other modifications to the worker-dispatcher communications can be made, including the following, which also give some idea of the capabilities that may be programmed into the independent workers: (A) workers may place partial results back on their input work pools, allowing results to be recursively accumulated, and/or (B) workers may request multiple items to stack before producing the partial result, reducing stacking time by reducing disk I/O; the number of items before producing a partial result can be held static, or can be based on a heat up/cool down heuristic, or based on the number of available items to be stacked in the central dispatcher state.

Figure 1:
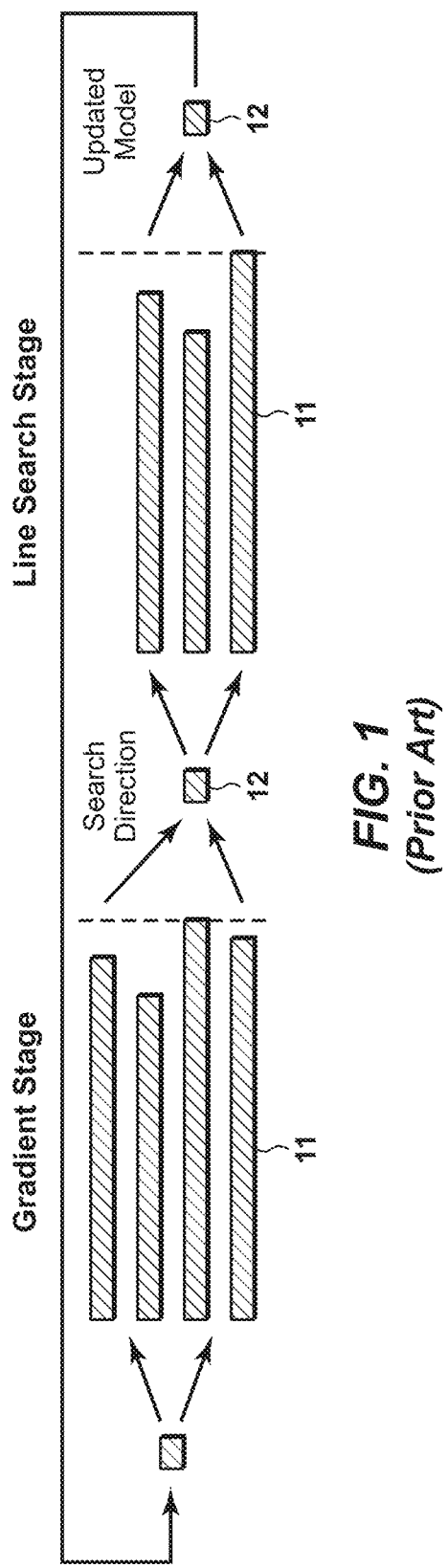
FIG. 1 is a schematic diagram showing an example of parallel and serial stages of computation on an FWI application.

In some of its embodiments, the present invention includes one or more of the following features: (1) application of a distributed, loosely coupled, many-task computing paradigm to seismic inversion algorithms on HPC systems, composed of (a) independent workers that are not aware of each other's existence that are either assigned tasks by a master controller (represented by "Inversion Control" among the management tools in FIG. 4) or request tasks from the master controller; (b) a master state storage entity (the central dispatcher) that separates computation state (e.g., progress of inversion; tasks completed, to be done, etc.) from the province of the workers. Due to serving only as a state storage mechanism, the central dispatcher may accept tens of thousands of workers and scale a single inversion to 100 k+ cores of an HPC system; and/or (c) one or more controllers/monitors that can affect computation state at runtime and drive the seismic inversion; (2) recording state of the iterative inversion process in the central dispatcher for purposes of applying scheduling, load balancing, and error recovery algorithms, where the state can include, but not be limited to (a) number of seismic gathers to process, number completed, and number currently processing, (b) task handout and completion times, and/or (c) all input parameters necessary to execute the tasks; (3) using the state to perform the following tasks to optimize performance and increase reliability (a) (may be performed by the central dispatcher) restart stopped inversions at the exact point they stopped, where the design of the central dispatcher and how the tasks are assigned work allows this to happen without need for additional logic, (b) (may be performed by the central dispatcher) use a history of task runtimes to set task timeout values, where tasks that do not return a result past a certain threshold (timeout) are either re-run or ignored; if task runtimes are not known or depend on dynamic information, setting timeouts is difficult (too short stops legitimate work, too long extends wait time to proceed with computation), but since the central dispatcher has all the task runtimes, a variety of heuristic rules based on statistical analysis may be used to base timeout values on previous task runtimes, (c) decide whether to re-run timeout tasks, or proceed without waiting for all results, dependent on a variety of factors including (i) skip unfinished work: (typically performed by a master controller, among the management tools, that monitors the inversion, e.g., monitors inversion state information compiled by the central dispatcher). During the reduction stage (see FIG. 1) the central dispatcher state can be used to determine exactly how many items are still left to stack, and if the inversion is waiting on only a small percentage of tasks, the master controller may choose to proceed forward for performance reasons without waiting for all tasks to finish; in the case of seismic processing, if a few gathers out of a large survey are not completed, and they are appropriately separated spatially (central controller contains this information too), they can simply be ignored; and/or (ii) re-run unfinished work: (the re-run logic typically is programmed in the central dispatcher, which keeps track of how many times a work item has been re-run, and decides whether it should be made available to the workers again). Failure mechanisms that cause many tasks to time out at once likely result from a transient hardware event, and because central dispatcher contains information about when failures occurred, failures close in time can be flagged and re-run as soon as they are identified; similarly, if a heuristic installed in the central dispatcher shows that the number of failures is determined to have a significant impact on result fidelity (if failures were skipped), the failed tasks can be re-run, (d) (may be performed by management tools used to read, analyze, and/or visualize information compiled and stored in the central dispatcher) allow users to monitor progress and intermediate values of their inversions from a variety of visualization tools using the state of the central dispatcher; this includes, but is not limited to: number of tasks completed in various stages of inversions, parameters calculated from each resulting task, and monitoring convergence of the optimization algorithm; (4) parallel reduction techniques (most notably stacking per-gather results into a final result) that utilize the above-described framework: (a) parallelization of stacking by introducing multiple stacker workers, or multiple levels of stacking; (b) recursive stacking by placing partially stacked results back on the input work pool of the stacking task, to be stacked again; and/or (c) batch stacking by requesting multiple inputs at once, reducing disk I/O and improving stacking time; the threshold for requesting multiple inputs may be adjusted either by a heat up/cool down heuristic or based on the state in the central dispatcher.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

The invention claimed is:

1. A seismic prospecting method for exploring for hydrocarbons, comprising:
obtaining seismic survey data;
processing the seismic survey data by full wavefield inversion to infer a subsurface model of velocity or other physical parameter, wherein the processing is performed on a system of parallel processors, called workers;
dividing the full wavefield inversion into a sequence of parallel stages and serial stages, and defining one or more computational tasks to be performed at each stage, wherein: (i) the computational tasks are parallel tasks for a parallel stage, (ii) parallel stages of the full wavefield inversion comprise a gradient computation stage and a line search stage, and (iii) the computational stages further comprise at least one stacking stage, which may be parallel or serial, in which results of parallel computations from a previous parallel stage are summed;
using a pool of workers, each programmed to initiate requests for, and to perform, at least one of the computational tasks, and perform them independently and without knowledge of the other workers, and wherein a task is sized for a worker according to a selected job scale;
using a central dispatcher unit, being a processor programmed to:
maintain task queues, where tasks are placed for pickup by the workers and where completed tasks are returned by the workers, and enforce dependencies between tasks; and
monitor and store information relating to a current state of the full wavefield inversion;
using a controller unit, interconnected with the central dispatcher and programmed with an optimization algorithm that decides, based on one or more spatial locations associated with one or more tasks, whether to complete the one or more tasks independently performed by the workers in a current iteration prior to beginning a next iteration;

wherein the one or more tasks comprises preparing a velocity model for simulating by dividing the velocity model into apertures around a shot area and wherein tasks for parallel stages are defined by source shot such the task assigned to each worker is dependent on a location for the shot area such that shots from an edge of the survey go to a first worker and where shots from a center of the survey go to a second worker; and wherein the controller unit ignores processing the tasks associated with a subset of the shot areas in order to proceed to the next iteration based on determining a percentage of the tasks for processing the shot areas in the subset to the tasks for processing all of the shot areas and based on the spatial separation of the shot areas in the subset.

2. The method of claim 1, wherein workers include logic and heuristics to place partial stacking results back into an input queue, allowing results to be recursively stacked.

3. The method of claim 1, wherein tasks are assembled in the central dispatcher before assignment in task queues such that any dependencies between tasks can be enforced.

4. The method of claim 1, wherein the current state of the full wavefield inversion includes one or more of
number of seismic gathers to process, number completed, and number currently processing;
task handout and completion times; and
input parameters necessary to execute the tasks.

5. The method of claim 1, wherein the central dispatcher unit is programmed to statistically analyze run-time data accumulated on completed tasks to set a timeout value for a task that is still running.

6. The method of claim 1, wherein the full wavefield inversion's computational stages comprise at least a first task of a first task type and a second task of a second task type; and
wherein each worker is programmed to perform specific task types.

7. The system of claim 1, wherein the workers further include logic and heuristics to request multiple items to stack before producing the partial stacking results.

8. The method of claim 1, wherein the one or more tasks further comprise processing seismic gathers; and
wherein deciding whether to complete processing the seismic gathers is based on spatial separation of the seismic gathers.

9. The method of claim 8, wherein the controller unit ignores processing the tasks associated with a subset of the seismic gathers in order to proceed to the next iteration based on determining a percentage of the tasks for processing the seismic gathers in the subset to the tasks for processing all of the seismic gathers and based on the spatial separation of the seismic gathers in the subset.

10. A seismic prospecting method for exploring for hydrocarbons, comprising:
obtaining seismic survey data;
processing the seismic survey data by full wavefield inversion to infer a subsurface model of velocity or other physical parameter, wherein the processing is performed on a system of parallel processors, called workers, and wherein the processing comprises:
dividing the full wavefield inversion into a sequence of parallel stages and serial stages, and defining one or more computational tasks to be performed at each stage, wherein: (i) the computational tasks are parallel tasks for a parallel stage, (ii) parallel stages of the full wavefield inversion comprise a gradient computation stage and a line search stage, and (iii) the computational stages further comprise at least one stacking stage, which may be parallel or serial, in which results of parallel computations from a previous parallel stage are summed;
using a pool of workers, each programmed to initiate requests for, and to perform, at least one of the computational tasks, and perform them independently and without knowledge of the other workers, and wherein a task is sized for a worker according to a selected job scale;
using a central dispatcher unit, being a processor programmed to:
maintain task queues, where tasks are placed for pickup by the workers and where completed tasks are returned by the workers, and enforce dependencies between tasks; and
monitor and store information relating to a current state of the full wavefield inversion; and
using a controller unit, interconnected with the central dispatcher and programmed with an optimization algorithm that decides, based on one or more spatial locations associated with one or more tasks, whether to complete the one or more tasks independently performed by the workers in a current iteration prior to beginning a next iteration;
wherein the one or more tasks comprise processing seismic gathers;
wherein deciding whether to complete processing the seismic gathers is based on spatial separation of the seismic gathers; and
wherein the controller unit ignores processing the tasks associated with a subset of the seismic gathers in order to proceed to the next iteration based on determining a percentage of the tasks for processing the seismic gathers in the subset to the tasks for processing all of the seismic gathers and based on the spatial separation of the seismic gathers in the subset.

* * * * *